United States Patent
Casmira et al.

(10) Patent No.: US 11,074,004 B2
(45) Date of Patent: Jul. 27, 2021

(54) TENANT-BASED TELEMETRY FOR PERSISTENT STORAGE MEDIA

(71) Applicant: Intel Corporation, Santa Clara, CA (US)

(72) Inventors: Jason Casmira, North Plains, OR (US);
Jawad Khan, Portland, OR (US);
David Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/248,463

(22) Filed: Jan. 15, 2019

(65) Prior Publication Data

US 2019/0146708 A1 May 16, 2019

(51) Int. Cl.
*G06F 3/06* (2006.01)

(52) U.S. Cl.
CPC .......... *G06F 3/0653* (2013.01); *G06F 3/0604* (2013.01); *G06F 3/0644* (2013.01); *G06F 3/0659* (2013.01); *G06F 3/0679* (2013.01)

(58) Field of Classification Search
CPC ...... G06F 3/0653; G06F 3/064; G06F 3/0644; G06F 3/0679; G06F 3/0659
See application file for complete search history.

(56) References Cited

U.S. PATENT DOCUMENTS

| | | | |
|---|---|---|---|
| 9,760,497 B2* | 9/2017 | Nakajima | G06F 13/1663 |
| 2012/0124294 A1* | 5/2012 | Atkisson | G06F 11/108 |
| | | | 711/135 |
| 2016/0011783 A1* | 1/2016 | Moon | G06F 3/0676 |
| | | | 711/162 |
| 2016/0334998 A1* | 11/2016 | George | G06F 3/0644 |
| 2017/0206030 A1* | 7/2017 | Woo | G06F 3/0679 |
| 2017/0262365 A1* | 9/2017 | Kanno | G06F 12/06 |
| 2017/0344430 A1* | 11/2017 | Greer | G06F 11/1456 |
| 2018/0107386 A1* | 4/2018 | Ahn | G06F 3/0653 |
| 2020/0004450 A1* | 1/2020 | Secatch | G06F 3/061 |
| 2020/0004676 A1* | 1/2020 | Perlmutter | G06F 3/0608 |

OTHER PUBLICATIONS

IBM Redbooks, "IBM Storage and the NVM Express Revolution" (Year: 2017).*
"NVM Express Revision 1.3", NVM Express, Inc., May 1, 2017, 282 pages.

* cited by examiner

*Primary Examiner* — Khoa D Doan
(74) *Attorney, Agent, or Firm* — Jordan IP Law, LLC

(57) ABSTRACT

An embodiment of a semiconductor apparatus may include technology to segregate a persistent storage media into two or more segments, and collect telemetry information on a per segment-basis, wherein a segment granularity is smaller than a namespace granularity. Other embodiments are disclosed and claimed.

11 Claims, 6 Drawing Sheets

TENANT-BASED TELEMETRY FOR PERSISTENT STORAGE MEDIA

TECHNICAL FIELD

Embodiments generally relate to storage systems. More particularly, embodiments relate to tenant-based telemetry for persistent storage media.

BACKGROUND

A persistent storage device, such as a solid state drive (SSD), may include media such as NAND memory. Some SSDs may have limited endurance. For example, NAND memory may only be written a finite number of times, and the SSD may wear out as the SSD ages. The Non-Volatile Memory EXPRESS (NVMe) 1.3 specification (nvmexpress.org) may define and/or support various technologies to address various endurance issues.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory (NVM). Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
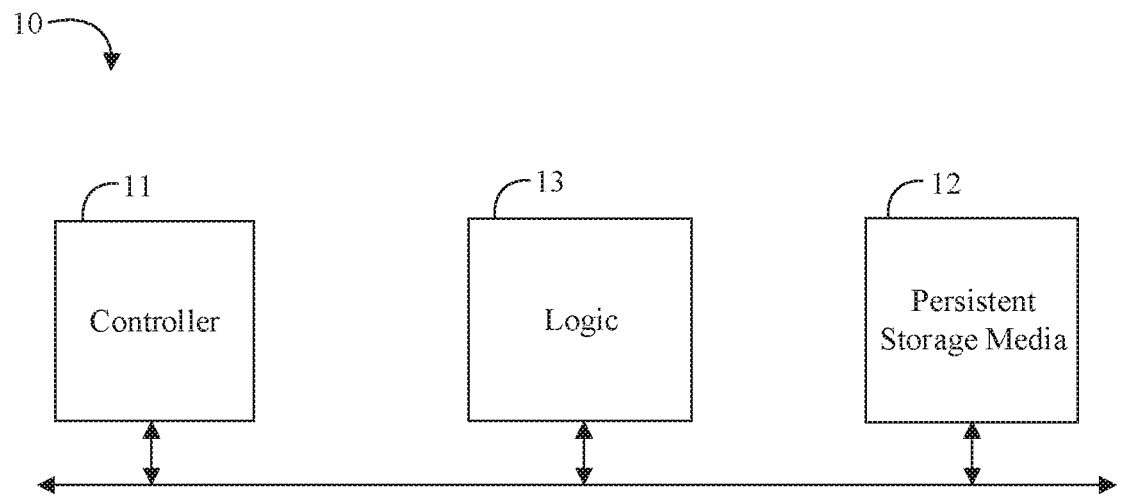
FIG. 1 is a block diagram of an example of an electronic storage system according to an embodiment.

Turning now to FIG. 1, an embodiment of an electronic storage system 10 may include persistent storage media 12, a controller 11 communicatively coupled to the persistent storage media, and logic 13 communicatively coupled to the controller 11 and the persistent storage media 12 to segregate the persistent storage media 12 into two or more segments, and collect telemetry information on a per segment-basis, where a segment granularity may be smaller than a namespace granularity. In some embodiments the telemetry information may include one or more of performance information and health information. In some embodiments, the logic 13 may identify one or more of count information, type information, and capacity information for a segment in response to a query from an agent. For example, the logic 13 may also assign a tenant to one of the two or more segments of the persistent storage media, and/or adjust a tenant job schedule based on per-segment telemetry information. For example, the persistent storage media 12 may include a SSD. In some embodiments, the logic 13 may be located in, or co-located with, various components, including the controller 11 (e.g., on a same die).

Embodiments of each of the above controller 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Embodiments of the controller 11 may include a general purpose controller, a micro-controller, a special purpose controller, a memory controller, a storage controller, a general purpose processor, a special purpose processor, a central processor unit (CPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, or other system memory may store a set of instructions which when executed by the controller 11 cause the system 10 to implement one or more components, features, or aspects of the system 10 (e.g., the logic 13, segregating the persistent storage media into two or more segments, collecting telemetry information on a per segment-basis, etc.).

Figure 2:
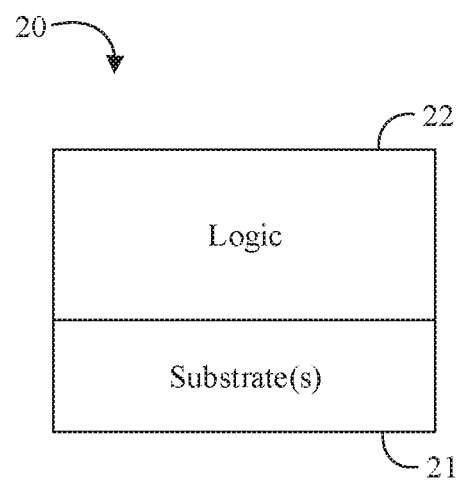
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to segregate the persistent storage media into two or more segments, and collect telemetry information on a per segment-basis, where a segment granularity is smaller than a namespace granularity. For example, the telemetry information may include one or more of performance information and health information. In some embodiments, the logic 22 may be configured to identify one or more of count information, type information, and capacity information for a segment in response to a query from an agent. For example, the logic 22 may also be configured to assign a tenant to one of the two or more segments of the persistent storage media. In some embodiments, the logic 22 may be further configured to adjust a tenant job schedule based on per-segment telemetry information. For example, the persistent storage media may include a SSD. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3B), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
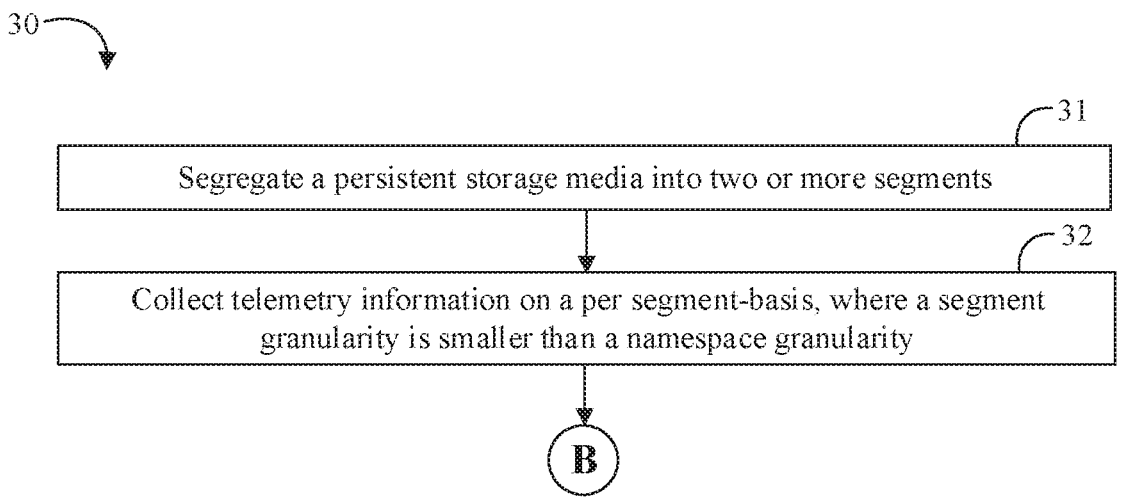
FIGS. 3A to 3B are flowcharts of an example of a method of controlling storage according to an embodiment.
Figure 3B:
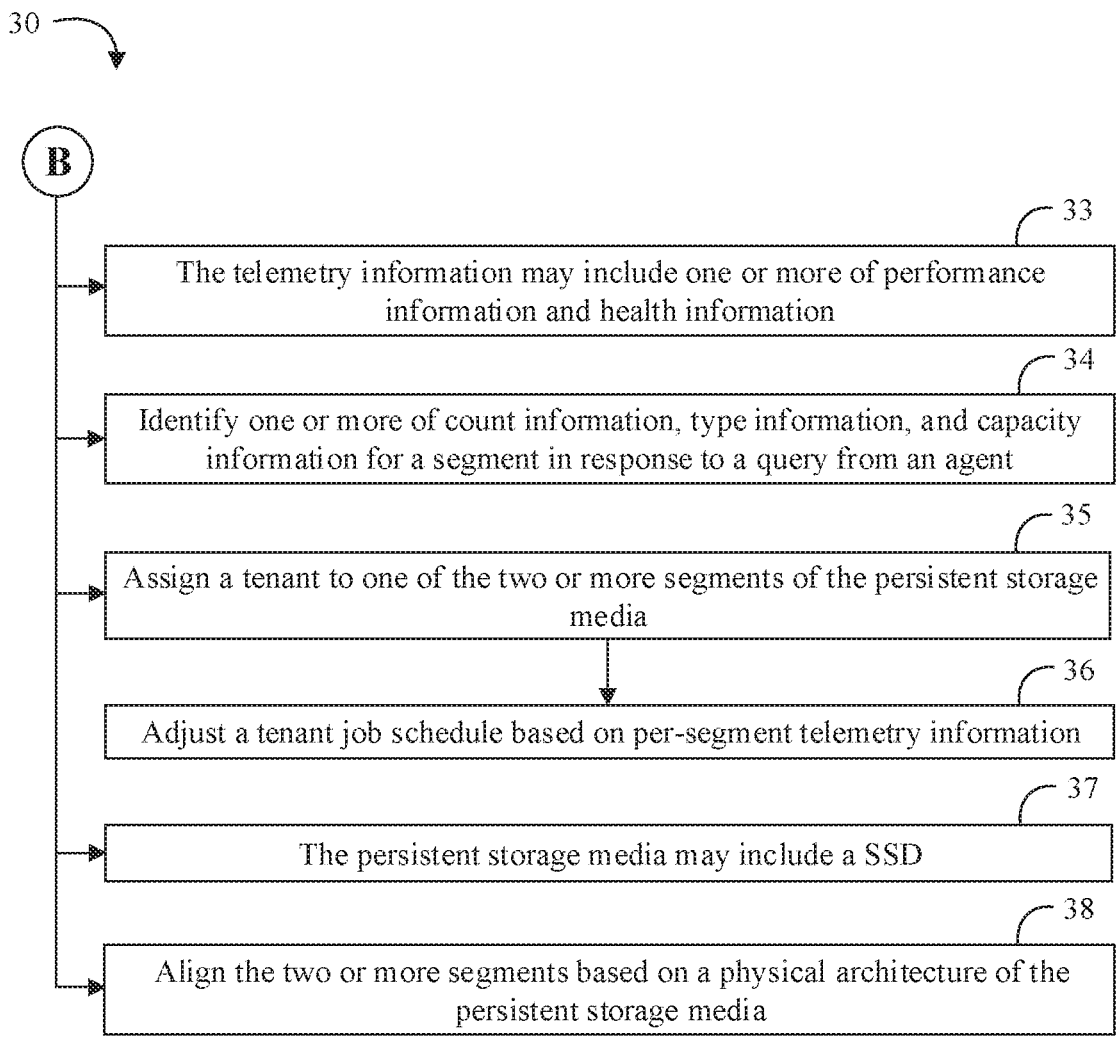

Turning now to FIGS. 3A to 3B, an embodiment of a method 30 of controlling storage may include segregating a persistent storage media into two or more segments at block 31, and collecting telemetry information on a per segment-basis, where a segment granularity is smaller than a namespace granularity at block 32. For example, the telemetry information may include one or more of performance information and health information at block 33. Some embodiments of the method 30 may include identifying one or more of count information, type information, and capacity information for a segment in response to a query from an agent at block 34. Some embodiments of the method 30 may further include assigning a tenant to one of the two or more segments of the persistent storage media at block 35, and/or adjusting a tenant job schedule based on per-segment telemetry information at block 36. For example, the persistent storage media may include a SSD at block 37. Some embodiments of the method 30 may further include aligning the two or more segments based on a physical architecture of the persistent storage media at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 21 to 27 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology to record and collect tenant-based telemetry from a NVM EXPRESS (NVME) Sets-capable SSD via an appropriately configured Set implementation. In cloud storage applications, for example, portions of a drive's total capacity may be assigned to a particular tenant. There may be several tenants that are accessing a given drive. A conventional storage system may provide no way to determine how a storage tenant is using that tenant's allocated portion of a storage device. This deficiency may present a problem for cloud service providers (CSPs) that meter and bill based on only the tenant's usage (e.g., vs. the entire platform or device), and also need to ensure that the customer/tenant's service level agreement (SLA) is met (e.g., and if not being met, to migrate the tenant job to another system that will meet the SLA).

As SSDs become denser (e.g., 16 TB, 32 TB, and beyond), there may be a need for CSPs to increase the density of containers. There may also be increased need for more cost-effective use of such containers by micro-services and independent tenant applications (e.g., serverless computing, function-as-a-service, etc.). Large numbers of containers, micro-services, and independent tenant applications may involve problems which are not as troublesome in smaller capacity drives. For example, if a given tenant class uses 1 GB of storage, a 32 TB drive may have up to 3,200 simultaneous tenants using the drive at the same time. The numbers are even larger with smaller tenants, such as micro-services, where a given application or service may be subdivided into smaller, simpler subcomponents (e.g., each of which can scale independently of the other subcomponents).

In the case of thousands (or tens of thousands) of tenants, there may be a number of problems including, for example, tenant-specific wear of the drive media, tenant-specific metering, and/or tenant-specific performance. Conventional storage devices may only report out health and telemetry data for the whole drive. Some NVME drives may optionally support a self-monitoring, analysis and reporting technology (SMART) log page per namespace, but because multiple tenants may share a namespace the SMART log page cannot be relied upon for per-tenant usage and wear of a contiguous section inside the drive. Updates to the NVME specification may support "Sets." Sets may mitigate "noisy neighbor" issues through logical segregation and may provide deterministic and non-deterministic windows to achieve an improved and consistent read and write quality of service (QoS). The NVME specification, however, does not address the per-tenant or per-segment health and performance telemetry problem.

Advantageously, some embodiments may provide a SSD that has segregated contiguous storage with corresponding telemetry collected per segment, including performance and health. For example, the SSD may identify the count, types, and capacities of its segments as well as any other capabilities when queried by a controlling agent or host. For example, capacity information may include capacity used by a segment and/or capacity available for a segment. Other examples of counts, types, and capabilities may include write amplification, bad block/block remap counts, raw bit error rate (RBER), and program/erase failure counts. In some embodiments, the SSD may include a controller that retains the state of the segments. For example, the controller may be capable of taking tenants submitted from the host and distributing them across the storage media. The controller may collect telemetry (e.g., performance and health) from the individual segments when desired (e.g., before and/or after submitting a tenant job to a SSD segment). This telemetry data may then be stored with the per segment state and reported to the host when requested. In some embodiments, the controller may use the health/wear state per segment to adjust tenant job scheduling amongst the segments (e.g., to assist with wear leveling for the SSD).

Some embodiments may advantageously solve the tenant-specific wear of the drive media problem by monitoring and performing wear leveling across the tenant segments. Some embodiments may advantageously provide tenant-specific metering such that a CSP may accurately track and charge a single tenant (e.g., where the tenant utilizes 1/3200th of a SSD), not only in capacity, but in input/output operations (IOPs), and other features. Some embodiments may also advantageously track and report tenant-specific performance such that a CSP may accurately track that the tenant is meeting its SLA even with the tenant's restriction to 1/3200th of the SSD resources. Some embodiments may provide technology for users of storage devices (e.g., customers, data centers, CSPs, micro-services, logical tenants, containers, etc.) to effectively partition, utilize, and manage (e.g., including metering, billing, etc.) increasingly denser/higher capacity SSDs. Some embodiments may further solve a "noisy neighbor" problem and input/output (TO) QoS via a novel implementation of NVME Sets. Some embodiments may enable the tracking of how a given customer's tenants wear the storage that the tenants use. For example, by snapshotting before and after a given tenant run, a CSP may determine if a particular customer would be better serviced by moving the customer's tenants to a higher endurance storage solution, or to storage that is more suited for read-only workloads, etc.

Figure 4:
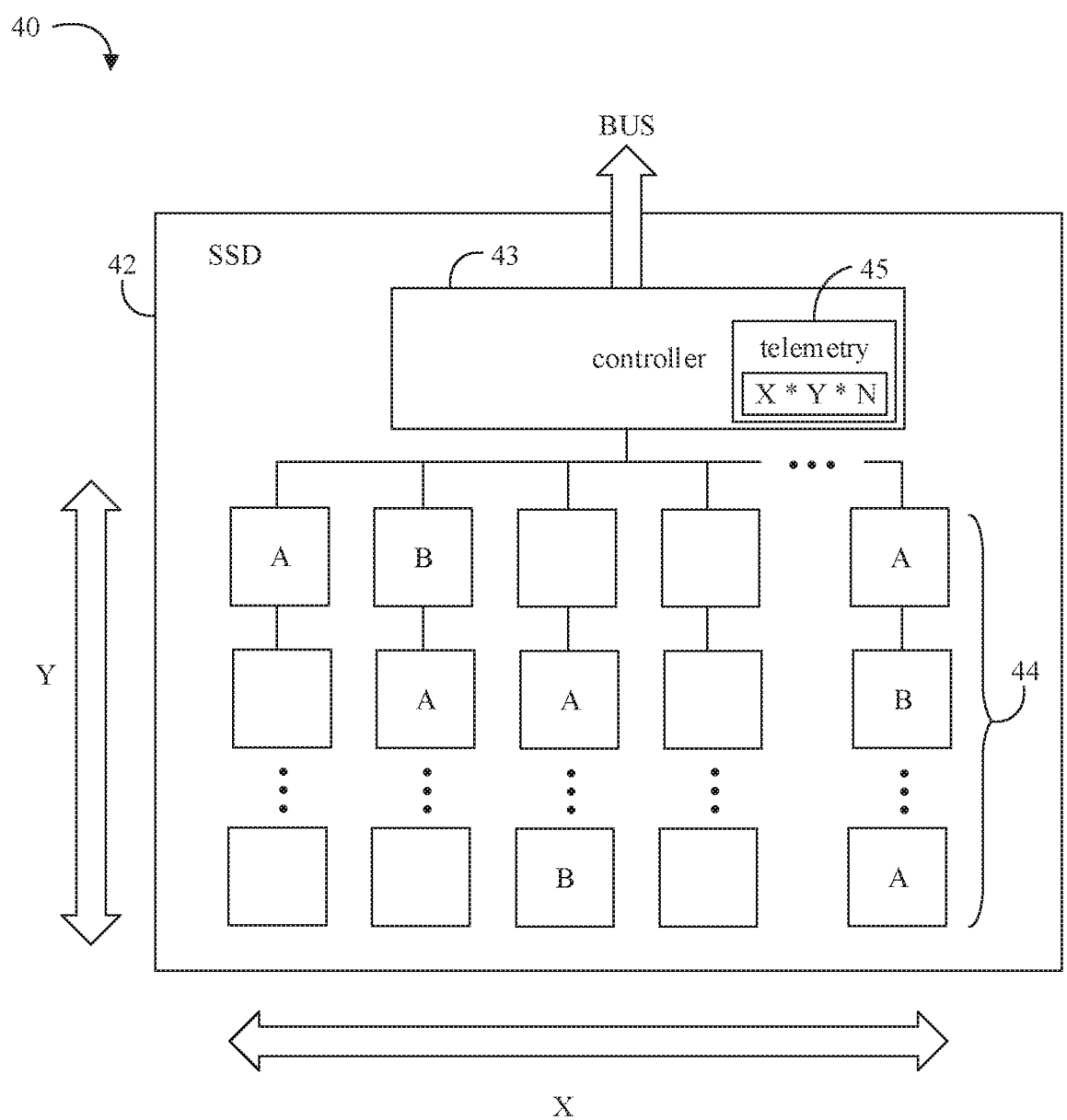
FIG. 4 is a block diagram of another example of an electronic storage system according to an embodiment.

Turning now to FIG. 4, an embodiment of an electronic storage system 40 may include a SSD 42 with a controller 43 communicatively coupled to an X by Y array of media 44. The physical arrangement of the media 44 may include one or more memory channels, with each memory channel coupled to one or more memory die (e.g., NAND memory die). Some embodiments may advantageously assign each tenant (e.g., tenant A, tenant B, etc.) to an NVMe Set. The controller 43 may further include telemetry logic 45 to collect telemetry data on a per-set basis, and to provide health and performance telemetry tracking and reporting on a per-tenant basis.

As implemented in FIG. 4, there may be some practical limitations to the number of tenants that may be supported. For example, if a Set is implemented logically, the amount of state necessary to track for any kind of telemetry would be "X*Y*N", where X and Y correspond to the number of occupied media (e.g., at a die level, or some other granularity), and N corresponds the number of tenants the SSD 42 can support. The tracking may be performed as a part of the SSD controller 43 (e.g., with the telemetry logic 45). The amount of state information alone (X*Y*N) may become prohibitive. The logistics that may be required to actually connect each of the occupied tenant locations to a given telemetry counter may also be relatively complex (e.g., and may need to be dynamically updated as tenants come and go).

Figure 5:
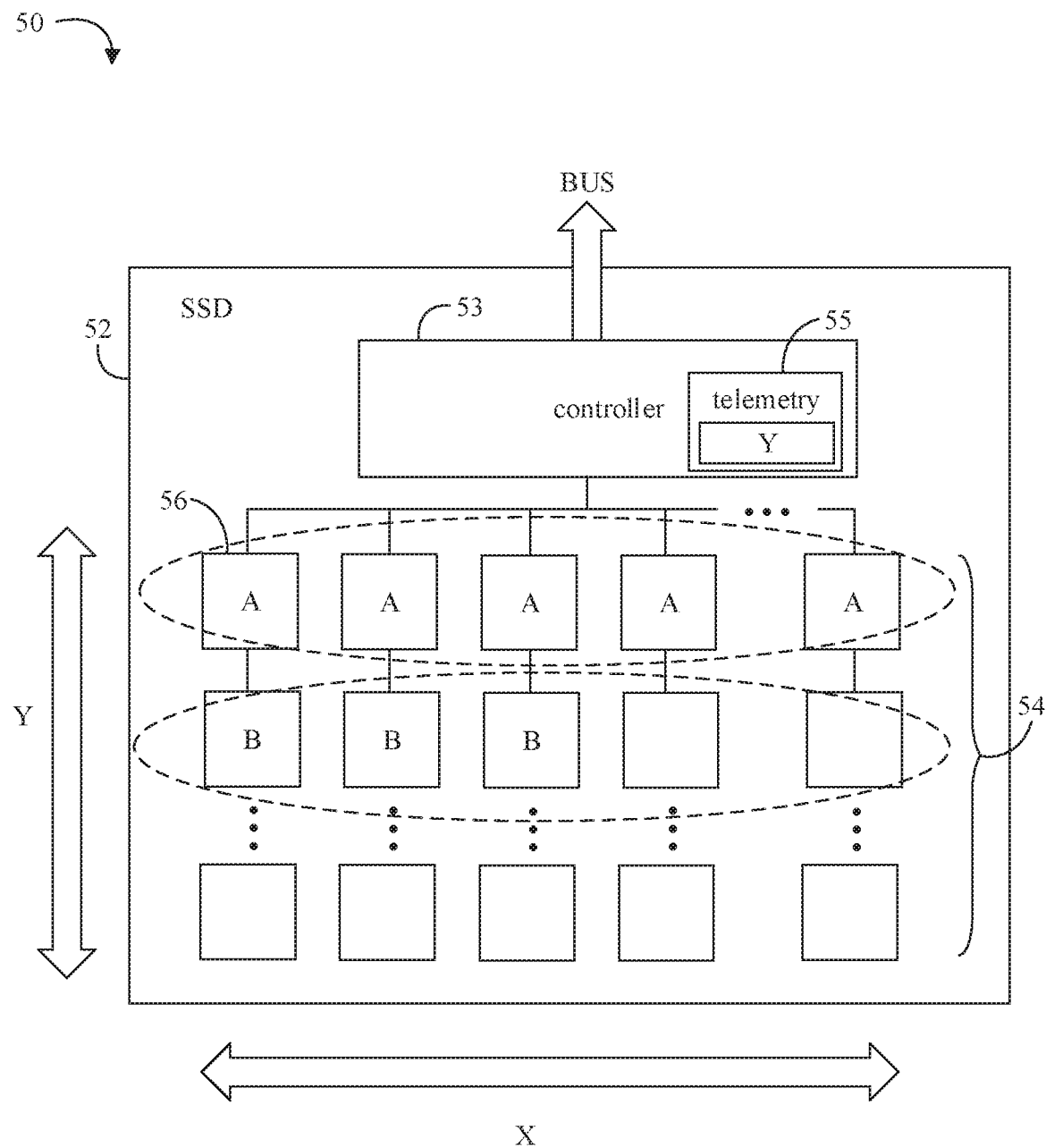
FIG. 5 is a block diagram of another example of an electronic storage system according to an embodiment.

Turning now to FIG. 5, an embodiment of an electronic storage system 50 may include a SSD 52 with a controller 53 communicatively coupled to an X by Y array of media 54.

The physical arrangement of the media 54 may include one or more memory channels, with each memory channel coupled to one or more memory die (e.g., NAND memory die). Some embodiments may advantageously assign each tenant (e.g., tenant A, tenant B, etc.) to a stripe 56. The controller 53 may further include telemetry logic 55 to collect telemetry data on a per-stripe basis, and to provide health and performance telemetry tracking and reporting on a per-tenant basis. In some embodiments, the relationship between the NVMe Sets and the segment stripes is that the segment stripe is a contiguous physical collection of the media to which the logical NVME Set is mapped.

Some embodiments may advantageously allow efficient health and telemetry tracking on a per-tenant basis, along with the ability to migrate or place tenants based on media wear. The SSD 52 may physically segregate the media 54 into segments or stripes 56, where each tenant may be placed on one or more stripes 56. The stripe granularity (e.g., one band or across several planes or dies) may depend on the implementation and would be fixed (e.g., at a smaller granularity than a namespace). For example, a given SSD may have a maximum number of independent tenants that the SSD may support based upon the particular striping implementation. Preferably, the stripes 56 may be aligned with a physical architecture of the media 54 (e.g., band, plane, die, channel, dual-inline memory module (DIMM), etc.). Each stripe supports only one tenant, but a tenant may be assigned to more than one stripe if the storage requirements of the tenant exceeds the capacity of a single stripe.

Advantageously, some embodiments may collapse the tracking of health and performance telemetry data into per-stripe tracking, which in FIG. 5 corresponds to Y because Y represents the number of stripes. As compared to the system 40, implementations of the system 50 may be tractable and more practical. Some embodiments may provide a solution to the problem of per-tenant health and performance telemetry data at a finest-grained level (e.g., maximum number of tenants supported) and may be extended where a given tenant occupies more than one stripe while still providing effective per-tenant tracking and reporting. The telemetry information may be tracked by the controller 53, which may provide per-tenant information when requested by a host or requesting agent (e.g., or even asynchronously).

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 6:
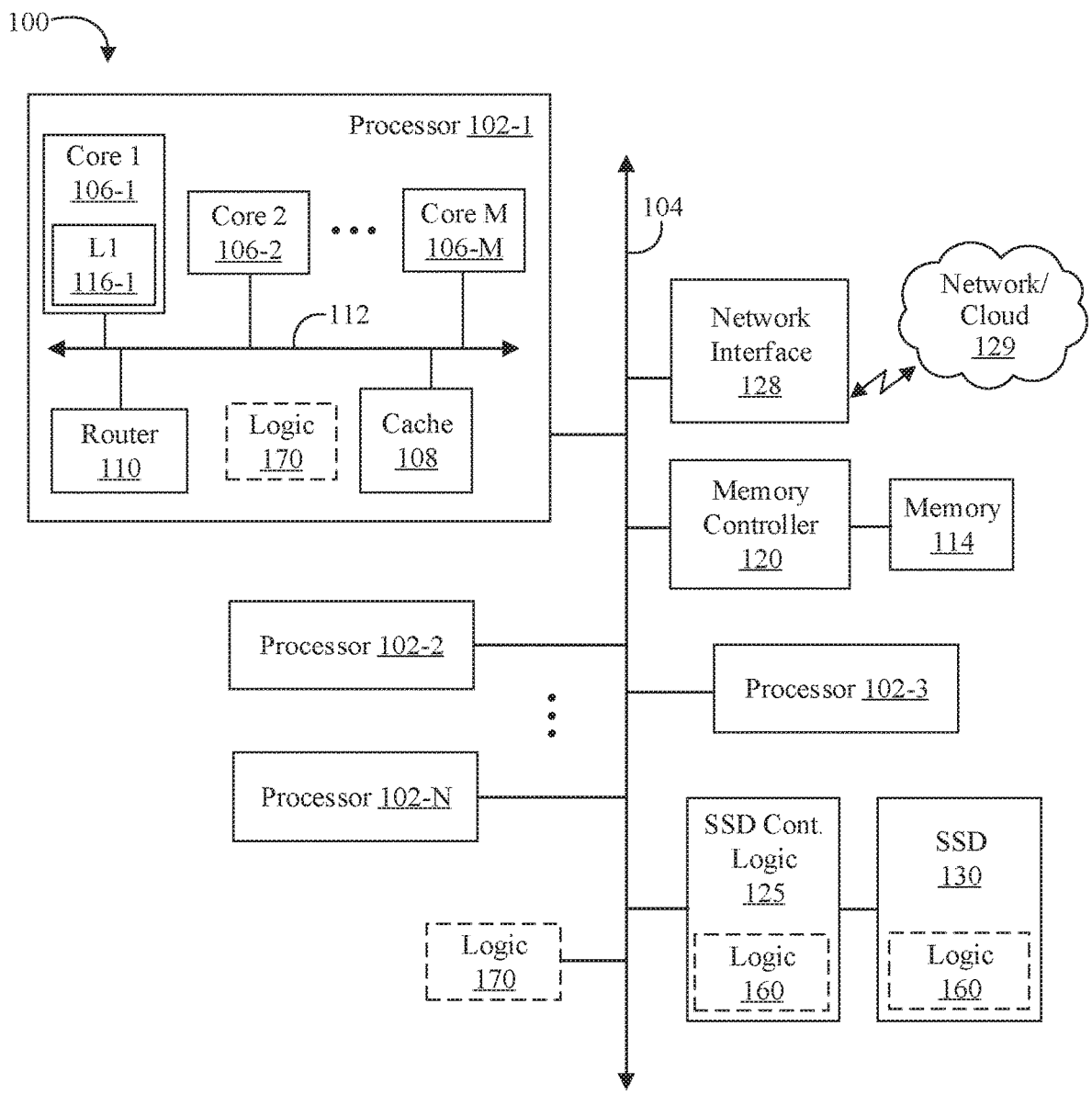
FIG. 6 is a block diagram of an example of a computing system according to an embodiment.

Turning now to FIG. 6, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 6, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 6, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 6, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic (such as those discussed with reference to FIG. 7) or provided on a same integrated circuit (IC) device in various embodiments (e.g., on the same IC device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

As illustrated in FIG. 6, SSD 130 may include logic 160, which may be in the same enclosure as the SSD 130 and/or fully integrated on a printed circuit board (PCB) of the SSD 130. The system 100 may include further logic 170 outside of the SSD 130. Advantageously, the logic 160 and/or logic 170 may include technology to implement one or more aspects of the method 30 (FIGS. 3A to 3B). For example, the logic 160 may include technology to segregate the SSD 130 into two or more segments, and collect telemetry information on a per segment-basis, where a segment granularity is smaller than a namespace granularity. For example, the telemetry information may include one or more of performance information and health information. In some embodiments, the logic 160 may be configured to identify one or more of count information, type information, and capacity information for a segment in response to a query from the processors 102 or the network interface 128. For example, the logic 160 may also be configured to assign a tenant to one of the two or more segments of the SSD 130. In some embodiments, the logic 160 may be further configured to adjust a tenant job schedule based on per-segment telemetry information. For example, the logic 170 may include technology to implement the host device/computer system/agent aspects of the various embodiments described herein (e.g., requesting information from the SSD 130, communicating tenant information to the SSD 130, etc.).

In other embodiments, the SSD 130 may be replaced with any suitable persistent storage technology/media. In some embodiments, the logic 160 may be coupled to one or more substrates (e.g., silicon, sapphire, gallium arsenide, printed circuit board (PCB), etc.), and may include transistor channel regions that are positioned within the one or more substrates. As shown in FIG. 6, features or aspects of the logic 160 and/or the logic 170 may be distributed throughout the system 100, and/or co-located/integrated with various components of the system 100.

Figure 7:
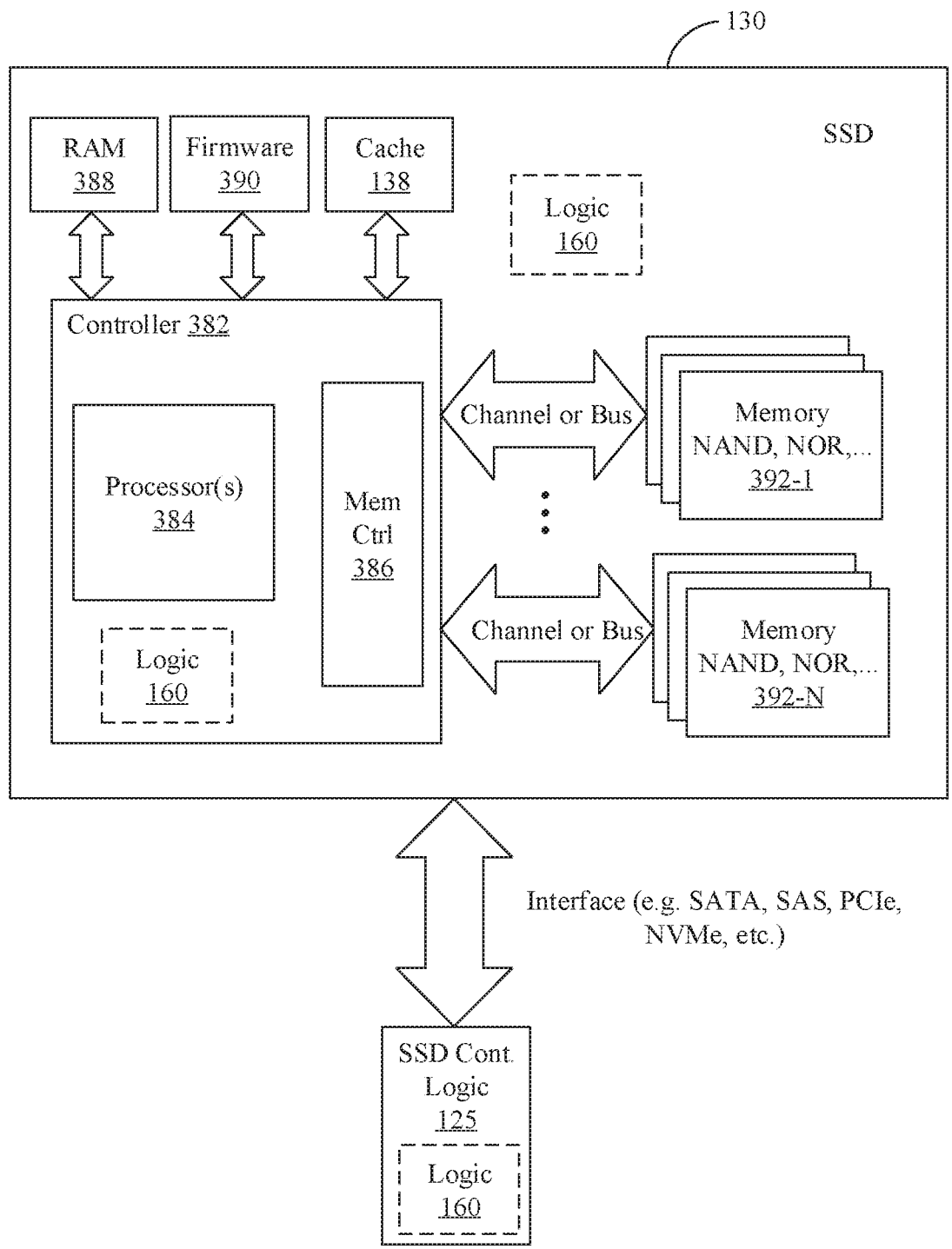
FIG. 7 is a block diagram of an example of a SSD according to an embodiment.

FIG. 7 illustrates a block diagram of various components of the SSD 130, according to an embodiment. As illustrated in FIG. 7, logic 160 may be located in various locations such as inside the SSD 130 or controller 382, etc., and may include similar technology as discussed in connection with FIG. 6. SSD 130 includes a controller 382 (which in turn includes one or more processor cores or processors 384 and memory controller logic 386), cache 138, RAM 388, firmware storage 390, and one or more memory modules or dies 392-1 to 392-N (which may include NAND flash, NOR flash, or other types of non-volatile memory). Memory modules 392-1 to 392-N are coupled to the memory controller logic 386 via one or more memory channels or busses. Also, SSD 130 communicates with logic 125 via an interface (such as a SATA, SAS, PCIe, NVMe, etc., interface). One or more of the features/aspects/operations discussed with reference to FIGS. 1-6 may be performed by one or more of the components of FIG. 7. Processors 384 and/or controller 382 may compress/decompress (or otherwise cause compression/decompression of) data written to or read from memory modules 392-1 to 392-N. Also, one or more of the features/aspects/operations of FIGS. 1-6 may be programmed into the firmware 390. Further, SSD controller logic 125 may also include logic 160.

Additional Notes and Examples

Example 1 includes a semiconductor apparatus for use with persistent storage media, comprising one or more substrates, and logic coupled to the one or more substrates, wherein the logic is at least partly implemented in one or more of configurable logic and fixed-functionality hardware logic, the logic coupled to the one or more substrates to segregate the persistent storage media into two or more segments, and collect telemetry information on a per segment-basis, wherein a segment granularity is smaller than a namespace granularity.

Example 2 includes the apparatus of Example 1, wherein the telemetry information includes one or more of performance information and health information.

Example 3 includes the apparatus of any of Examples 1 to 2, wherein the logic is further to identify one or more of count information, type information, and capacity information for a segment in response to a query from an agent.

Example 4 includes the apparatus of any of Examples 1 to 3, wherein the logic is further to assign a tenant to one of the two or more segments of the persistent storage media.

Example 5 includes the apparatus of Example 4, wherein the logic is further to adjust a tenant job schedule based on per-segment telemetry information.

Example 6 includes the apparatus of any of Examples 1 to 5, wherein the persistent storage media comprises a solid state drive.

Example 7 includes the apparatus of any of Examples 1 to 6, wherein the logic coupled to the one or more substrates includes transistor channel regions that are positioned within the one or more substrates.

Example 8 includes an electronic storage system, comprising persistent storage media, a controller communicatively coupled to the persistent storage media, and logic communicatively coupled to the controller and the persistent storage media to segregate the persistent storage media into two or more segments, and collect telemetry information on a per segment-basis, wherein a segment granularity is smaller than a namespace granularity.

Example 9 includes the system of Example 8, wherein the telemetry information includes one or more of performance information and health information.

Example 10 includes the system of any of Examples 8 to 9, wherein the logic is further to identify one or more of count information, type information, and capacity information for a segment in response to a query from an agent.

Example 11 includes the system of any of Examples 8 to 10, wherein the logic is further to assign a tenant to one of the two or more segments of the persistent storage media.

Example 12 includes the system of Example 11, wherein the logic is further to adjust a tenant job schedule based on per-segment telemetry information.

Example 13 includes the system of any of Examples 8 to 12, wherein the persistent storage media comprises a solid state drive.

Example 14 includes a method of controlling storage, comprising segregating a persistent storage media into two or more segments, and collecting telemetry information on a per segment-basis, wherein a segment granularity is smaller than a namespace granularity.

Example 15 includes the method of Example 14, wherein the telemetry information includes one or more of performance information and health information.

Example 16 includes the method of any of Examples 14 to 15, further comprising identifying one or more of count information, type information, and capacity information for a segment in response to a query from an agent.

Example 17 includes the method of any of Examples 14 to 16, further comprising assigning a tenant to one of the two or more segments of the persistent storage media.

Example 18 includes the method of Example 17, further comprising adjusting a tenant job schedule based on per-segment telemetry information.

Example 19 includes the method of any of Examples 14 to 18, wherein the persistent storage media comprises a solid state drive.

Example 20 includes the method of any of Examples 14 to 19, further comprising aligning the two or more segments based on a physical architecture of the persistent storage media.

Example 21 includes at least one computer readable storage medium, comprising a set of instructions, which when executed by a computing device, cause the computing device to segregate a persistent storage media into two or more segments, and collect telemetry information on a per segment-basis, wherein a segment granularity is smaller than a namespace granularity.

Example 22 includes the at least one computer readable storage medium of Example 21, wherein the telemetry information includes one or more of performance information and health information.

Example 23 includes the at least one computer readable storage medium of any of Examples 21 to 22, comprising a further set of instructions, which when executed by the computing device, cause the computing device to identify one or more of count information, type information, and capacity information for a segment in response to a query from an agent.

Example 24 includes the at least one computer readable storage medium of any of Examples 21 to 23, comprising a further set of instructions, which when executed by the computing device, cause the computing device to assign a tenant to one of the two or more segments of the persistent storage media.

Example 25 includes the at least one computer readable storage medium of Example 24, comprising a further set of instructions, which when executed by the computing device, cause the computing device to adjust a tenant job schedule based on per-segment telemetry information.

Example 26 includes the at least one computer readable storage medium of any of Examples 21 to 25, wherein the persistent storage media comprises a solid state drive.

Example 27 includes the at least one computer readable storage medium of any of Examples 21 to 26, comprising a further set of instructions, which when executed by the computing device, cause the computing device to align the two or more segments based on a physical architecture of the persistent storage media.

Example 28 includes a storage controller apparatus, comprising means for segregating a persistent storage media into two or more segments, and means for collecting telemetry information on a per segment-basis, wherein a segment granularity is smaller than a namespace granularity.

Example 29 includes the apparatus of Example 28, wherein the telemetry information includes one or more of performance information and health information.

Example 30 includes the apparatus of any of Examples 28 to 29, further comprising means for identifying one or more of count information, type information, and capacity information for a segment in response to a query from an agent.

Example 31 includes the apparatus of any of Examples 28 to 30, further comprising means for assigning a tenant to one of the two or more segments of the persistent storage media.

Example 32 includes the apparatus of Example 31, further comprising means for adjusting a tenant job schedule based on per-segment telemetry information.

Example 33 includes the apparatus of any of Examples 28 to 32, wherein the persistent storage media comprises a solid state drive.

Example 34 includes the apparatus of any of Examples 28 to 33, further comprising means for aligning the two or more segments based on a physical architecture of the persistent storage media.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with persistent storage media, comprising:
   one or more substrates; and
   logic coupled to the one or more substrates, the logic coupled to the one or more substrates to:
      segregate the persistent storage media into two or more segments, wherein the persistent storage media comprises a solid state drive,
      assign a tenant to one of the two or more segments of the persistent storage media, wherein the two or more segments each comprise a contiguous physical collection of a physical architecture of the persistent storage media to which a logical NON-VOLATILE MEMORY EXPRESS Set is mapped, wherein the tenant is assigned to the logical NON-VOLATILE MEMORY EXPRESS Set, and wherein the two or more segments each support only one tenant,
      collect, via the solid state drive, telemetry information on a per segment-basis, wherein a segment granularity is smaller than a namespace granularity, and
      identify, via the solid state drive, one or more of count information, type information or capacity information on a per segment-basis in response to a query from an agent.

2. The semiconductor apparatus of claim 1, wherein the telemetry information includes one or more of performance information and health information.

3. The semiconductor apparatus of claim 1, wherein the logic is further to:
   adjust a tenant job schedule based on per-segment telemetry information.

4. The semiconductor apparatus of claim 1, wherein the logic coupled to the one or more substrates includes transistor channel regions that are positioned within the one or more substrates.

5. An electronic storage system, comprising:
   persistent storage media;
   a controller communicatively coupled to the persistent storage media; and
   logic communicatively coupled to the controller and the persistent storage media to:
      segregate the persistent storage media into two or more segments, wherein the persistent storage media comprises a solid state drive,
      assign a tenant to one of the two or more segments of the persistent storage media, wherein the two or more segments each comprise a contiguous physical collection of a physical architecture of the persistent storage media to which a logical NON-VOLATILE MEMORY EXPRESS Set is mapped, wherein the tenant is assigned to the logical NON-VOLATILE MEMORY EXPRESS Set, and wherein the two or more segments each support only one tenant,
      collect, via the solid state drive, telemetry information on a per segment-basis, wherein a segment granularity is smaller than a namespace granularity, and
      identify, via the solid state drive, one or more of count information, type information or capacity information on a per segment-basis in response to a query from an agent.

6. The electronic storage system of claim 5, wherein the telemetry information includes one or more of performance information and health information.

7. The electronic storage system of claim 5, wherein the logic is further to:
   adjust a tenant job schedule based on per-segment telemetry information.

8. A method of controlling storage, comprising:
   segregating a persistent storage media into two or more segments, wherein the persistent storage media comprises a solid state drive;
   assigning a tenant to one of the two or more segments of the persistent storage media, wherein the two or more segments each comprise a contiguous physical collection of a physical architecture of the persistent storage media to which a logical NON-VOLATILE MEMORY EXPRESS Set is mapped, wherein the tenant is assigned to the logical NON-VOLATILE MEMORY EXPRESS Set, and wherein the two or more segments each support only one tenant;
   collecting, via the solid state drive, telemetry information on a per segment-basis, wherein a segment granularity is smaller than a namespace granularity; and
   identifying, via the solid state drive, one or more of count information, type information or capacity information on a per segment-basis in response to a query from an agent.

9. The method of claim 8, wherein the telemetry information includes one or more of performance information and health information.

10. The method of claim 8, further comprising:
    adjusting a tenant job schedule based on per-segment telemetry information.

11. The method of claim 8, further comprising:
    aligning the two or more segments based on a physical architecture of the persistent storage media.

* * * * *